United States Patent [19]

Somigli et al.

[11] Patent Number: 4,737,779
[45] Date of Patent: Apr. 12, 1988

[54] DATA PROCESSING APPARATUS WITH DOT CHARACTER GENERATOR

[75] Inventors: Mario Somigli, Burolo; Antonio Schinco, Turin, both of Italy

[73] Assignee: Ing. C. Olivetti & C., S.p.A., Ivrea, Italy

[21] Appl. No.: 645,213

[22] Filed: Aug. 29, 1984

[30] Foreign Application Priority Data

Aug. 29, 1983 [IT] Italy ................. 67903 A/83

[51] Int. Cl.⁴ .............................................. G09G 1/16
[52] U.S. Cl. ...................................... 340/745; 340/751; 340/750; 340/790
[58] Field of Search ............... 340/731, 732, 733, 745, 340/748, 750, 751, 721, 790, 747

[56] References Cited

U.S. PATENT DOCUMENTS

| | | | |
|---|---|---|---|
| 3,996,584 | 12/1976 | Plager | 340/745 |
| 4,028,724 | 6/1977 | Gramam | 340/790 |
| 4,181,973 | 1/1980 | Tseng | 340/751 X |
| 4,193,119 | 3/1980 | Arase et al. | 340/751 X |
| 4,286,329 | 8/1981 | Goertzel et al. | 340/731 X |
| 4,298,957 | 11/1981 | Duvall et al. | 340/751 X |
| 4,415,890 | 11/1983 | Iwakura | 340/748 X |
| 4,428,065 | 1/1984 | Duvall et al. | 340/731 X |
| 4,439,761 | 3/1984 | Fleming et al. | 340/790 |
| 4,458,333 | 7/1984 | Smith | 340/748 X |
| 4,484,192 | 11/1984 | Seitz | 340/721 |
| 4,504,828 | 3/1985 | Couper et al. | 340/748 X |
| 4,511,267 | 4/1985 | Pokorny et al. | 340/731 X |
| 4,544,276 | 10/1985 | Horodeck | 340/731 X |
| 4,559,615 | 12/1985 | Goo et al. | 340/731 X |

Primary Examiner—Marshall M. Curtis
Attorney, Agent, or Firm—Banner, Birch, McKie & Beckett

[57] ABSTRACT

The apparatus comprises a dot matrix character generator (16) which includes a ROM (17) for a series of standard alphanumeric characters, for the ISO alphabets, the Kana alphabet and a series of Kanji ideograms which are more frequently used. The character generator further comprises a RAM (18) in which other Kanji idoegrams can be selectively stored. They are normally registered in an archive mass memory (47) and can be sequentially transferred to the RAM, a portion of which operates as a FIFO memory if the code required is not present therein. The character generator (16) is connected by means of an internal bus (42) to at least a video control unit (19) and a control unit (27) for a dot printer (38), which units may be served in accordance with a bus priority and arbitration logic. The printer is provided with a printer control unit (93, 82, 83, 41) having an auxiliary character generator (41) for the ISO and Kana characters and a reduced group of Kanji characters. The associates control unit (27) is capable of feeding to the printer control unit both the codes of the characters of the auxiliary generator (41) and the print signals in respect of the dots given by the main character generator (16).

9 Claims, 5 Drawing Sheets

DATA PROCESSING APPARATUS WITH DOT CHARACTER GENERATOR

BACKGROUND OF THE INVENTION

The present invention relates to a data processing apparatus having a controller for at least one output peripheral, wherein a character generator is operable to provide for each character code a series of signals corresponding to the dots of the character in accordance with a predetermined matrix.

Various apparatuses of the above-indicated type are known, wherein the peripheral comprises a VDU or a printer. In such arrangements, in general, the character generator comprises a read only memory (ROM) which is recorded with the desired sets of characters. In the case of Oriental languages in which the number of characters or ideograms is very high, the character generator in the known apparatuses necessarily contains a limited number of characters selected from those which are more commonly used for the specific application, whereby to go from one field of application to another, it is normally necessary completely to program the generation of characters.

SUMMARY OF THE INVENTION

The technical problem of the present invention lies in providing a data processing apparatus wherein the character generator has a very high capacity and does not require particular programming for Kanji ideograms.

That technical problem is solved by the apparatus according to the invention, which is characterised in that said character generator comprises a portion capable of being loaded with a reduced number of characters normally contained in a mass memory, means being provided for changing the characters of said portion when a character requested by said peripheral is not found in said portion.

In accordance with another feature of the invention, the character generator is connected by way of an internal bus to a plurality of units of which at least one comprises a dot printer for selectively receiving the codes for an auxiliary character generator and print signals directly from the main character generator, priority and arbitration means in respect of the internal bus being provided to coordinate the requests for characters of said peripheral units.

BRIEF DESCRIPTION OF THE DRAWINGS

The invention will be described in more detail, by way of example, with reference to the accompanying drawings, in which.

DESCRIPTION OF THE PREFERRED EMBODIMENTS

Ideogram script generally comprises a very high number of ideograms or characters. In particular, the Japanese script referred to as Kanji comprises many thousands of characters.

The Japanese standards organisation (JIS) has already standardized the codes of about 7000 characters, including those provided by the ISO standard for the Latin, Cyrillic, etc. alphabets which are coded with a byte. The Japanese standard further comprises the following three basic parts:

(a) 453 characters of the Kana alphabet, with numbers and symbols and a set of reduced Kanji characters, all coded with one byte, following a command, for example the command ESC (escape);

(b) 2965 Kanji characters, referred to as first level JIS, which are the most widely used, being coded with two bytes; and (c) 3400 Kanji characters, referred to as second level JIS, also coded with two bytes.

All the remaining Kanji characters which have not yet been standardized are referred to as "Gaiji".

Figure 1:
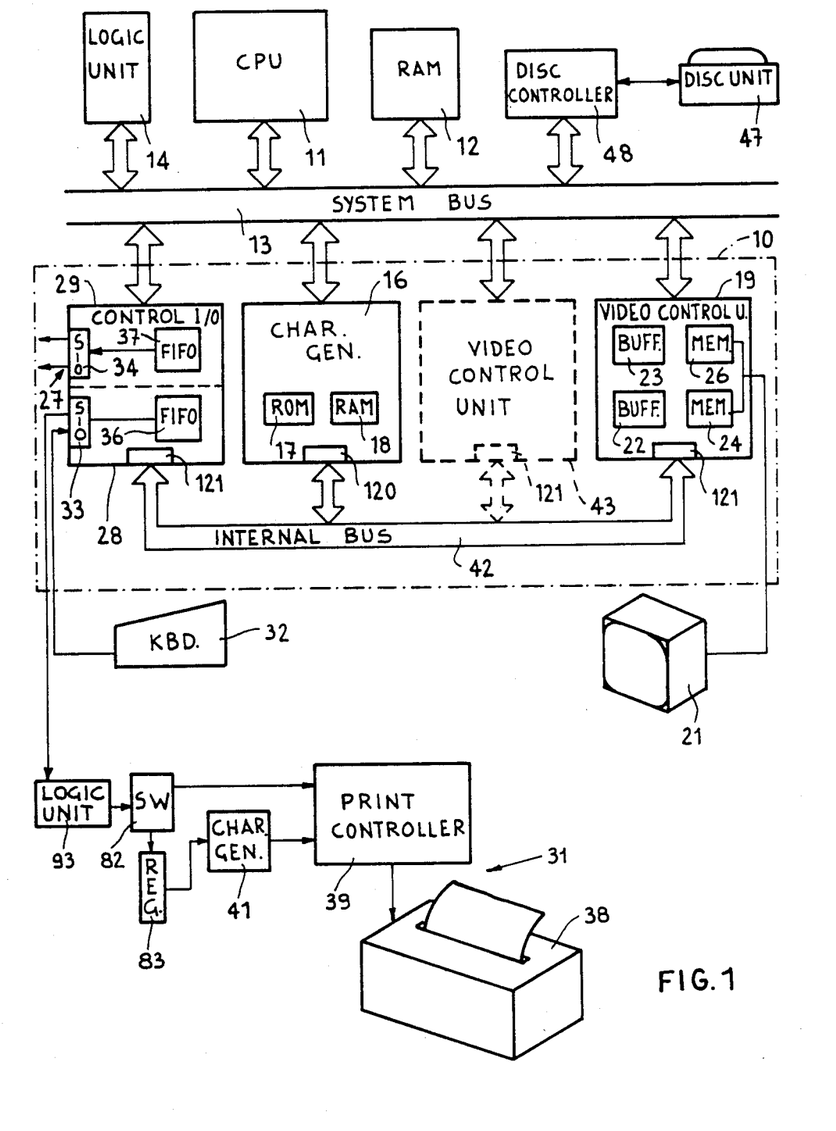
FIG. 1 shows a general diagram of a data processing apparatus having a controller for at least one output peripheral, in accordance with the invention.

The data processing apparatus according to the invention essentially comprises a controller, as generally indicated by reference numeral 10 in FIG. 1, which makes it possible to print and optionally display messages which include both coded characters and Gaiji characters. Printing and display are effected by dot matrices. The basic matrix of the character is one of 28×24 dots of which two rows of dots at the top and the bottom and a column of dots at the right and at the left form the space between two lines and the space between two characters.

The controller 10 is connected to a central processing unit CPU 11 which can process 16 bit words, and a random access memory RAM 12 by way of a system channel or bus 13. In particular, the bus 13 comprises a series of conductors for the data, a series of conductors for the addresses of the RAM 12 and the peripheral units including those connected to the controller 10 and a series of conductors for commands and handshaking between the CPU 11, the RAM 12 and the peripheral units.

Also connected to the bus 13 is a logic unit LU 14 which, under the control of the CPU 11, can manage a series of interrupts in accordance with predetermined priorities which take account of the time of execution of the interrupts and the possible need of software modules, as described in the present applicants' published European patent application EP No. 0 079 698. The controller 10 comprises a character generator 16 which essentially comprises a read only memory ROM 17 and a RAM 18.

The ROM 17 has a capacity of about 2M bits and is registered with the dots of all the first level JIS characters which are used both for printing and for display purposes. The ROM 17 has an output on three bytes which represent a row of dots of the matrix, whereby a character requires 72 bytes of the ROM 17. Also registered in the ROM 17 are the ISO characters and the Kana characters on a 12×24 dot matrix, which are used only for display purposes.

The RAM 18 has a capacity of 64K bytes and is capable of selectively registering the dots of 512 second level JIS characters and the Gaiji characters, to be used both for printing and for display, and will be better appreciated hereinafter.

The controller 10 further comprises a control unit 19 for a VDU 21, for example of the cathode ray tube type. The unit 19 essentially comprises a 2K byte buffer 22 for the codes of the characters to be displayed and a buffer 23 for the attributes of the respective characters such as the colour, the phantom character (that is to say, temporarily not visible), the column arrangements, the luminosity of the character (high/low) and flashing. The two buffers 22 and 23 may contain the codes of at least one video page which is formed for example by 25 rows, each of 80 characters.

The unit 19 further comprises two memories 24 and 26 associated with the two buffers 22 and 23, which are used for refreshing the data displayed.

Finally, the controller 10 comprises a control module 27 formed by two control units 28 and 29 for two different operating stations, each comprising a printer 31 and a keyboard 32 for the keying in of data and commands. Each control unit 28 and 29 comprises a serial input-output interface unit SIO 33 and SIO 34 connected to a FIFO memory 36 and 37 respectively. The printer 31 comprises a high-definition dot printing device 38, for example of the type having a needle-type serial printing head with two columns of 12 needles each, being mutually offset in a direction perpendicular to the feed movement of the head. The printer 31 further comprises a control unit 39 for the various functions of the printing device 38, which is connected to the respective SIO 33 or 34. Associated with the unit 39 is its own standard character generator formed by an ROM 41 in which there are recorded, in accordance with a reduced matrix depending on the spacing (for example for a spacing of 10 characters per inch, a matrix comprising 16×18 dots), the characters which are provided by the ISO code (numbers, Latin, Cyrillic alphabet, etc.), the coded characters from the Kana alphabet and those from the reduced Kanji set. The characters stored in the ROM 41 are intended only for printing and may be addressed by the respective codes, as will be better appreciated hereinafter.

According to the invention, the character generator 16, the video control unit 19 and the control module 27 are interconnected by an internal bus or channel 42 which permits a plurality of peripherals to be controlled. The bus 42 (FIGS. 3 and 5) comprises a data bus 42' and a control bus 42", by way of which the various units and modules may exchange data and commands without passing through the system bus 13. In addition, the units and modules are individually connected to the system bus 13 whereby they are considered by the CPU 11 (see FIG. 1) as single peripherals. The controller 10 may include other control units and modules connected to the two buses 13 and 42. By way of example, FIG. 1 shows a second video control unit 43, to be possibly assigned to the second operating station controlled by the unit 29.

The Kanji and Gaiji ideograms of the RAM 18 are stored upon initialization of the apparatus.

For that purpose, the ideograms which are not stored in the ROM 17 are normally recorded or archived in a mass memory, for example a magnetic disc unit 47 which, by way of a corresponding control unit 48, is connected to the system bus 13.

From investigations made, it was found that the principal fields of application currently use around 350 Kanji and Gaiji characters in addition to the first level characters stored in the ROM 17, while many other thousands of ideograms are used only from time to time. For that purpose, the RAM 18 comprises a first region 49 (see FIG. 5) which stores or retains 384 Kanji and Gaiji characters selected from those which are more frequently used in the particular field of use.

Figure 5:
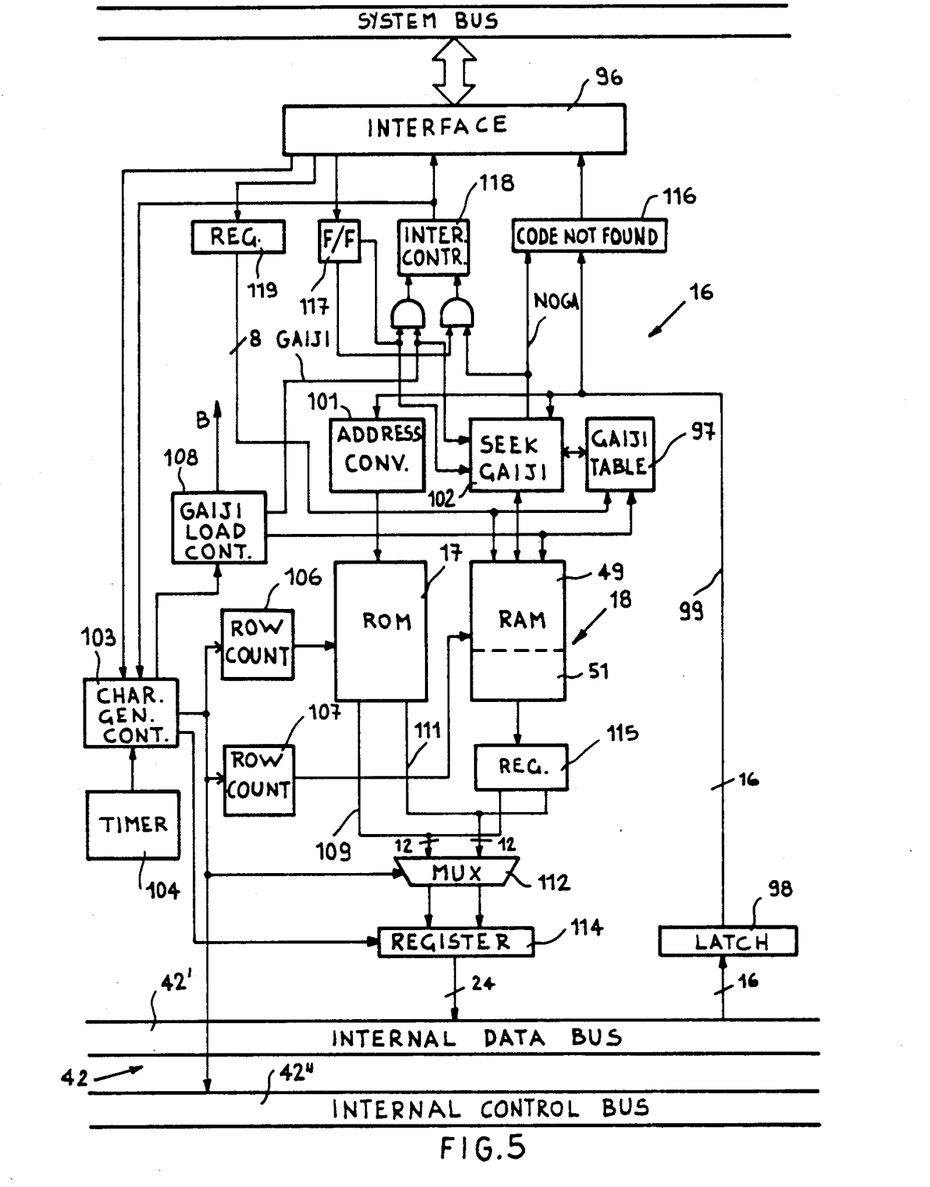
FIG. 5 is a block diagram of the character generator of the apparatus.

The first of those characters is a special character, referred to as the "blob", which is formed by seven vertical columns and which is used by the VDU in certain cases, as will be better appreciated hereinafter. The RAM 18 comprises a second region 51 which is used as a FIFO for the other ideograms of the disc unit 47 (see FIG. 1) if the controller 10 is asked for a character that at the time is not stored in the RAM 18.

The apparatus treats the characters in accordance with an internal code (ICR) that is substantially similar to the codes of the ISO and JIS standards, but which is particularly suited for the use of the controller. The ICR code is produced from the standard codes by means of a software module for code translation which is executed in the CPU 11 which, in a similar manner, executes the reverse translation when it is to exchange the characters with other equipment that does not use the ICR code.

The ICR code represents the ISO characters, including the Kana and the reduced Kanji characters, by means of one byte, and represents all the Kanji and Gaiji characters by means of two bytes. In particular, the ICR codes of one byte occupy the hexadecimal columns 0–7 and A–D, the ICR codes of two bytes have in the first byte the bit b7=1 and the bits 0–6 different from those of the columns A–D and different from those of the character FF (DELETE) of the column F. That byte may therefore be recognized as the first Kanji or Gaiji character byte, which is followed by the second byte of the same character. In that way it is possible to achieve a high number of codes while making the ISO-Kanji distinction lie in the code itself, rather than in an attribute of the character.

The ROM 17 and the RAM 18 (FIG. 1) always require two bytes for addressing. Therefore, the ICR codes formed by a single byte must be transcoded into an address code which will be referred to as KIC and which comprises two bytes (see FIG. 2). In particular, that code is produced by adding a second byte to the single byte ICR code. The ICR codes of two bytes remain unchanged in the code KIC, whereby they have b7=1 in the first byte.

The Kanji codes to be stored in the RAM 18 have bit 7=1 in the second byte, and bit 6=0 in the first byte; all the others are Gaiji codes.

Figure 2:
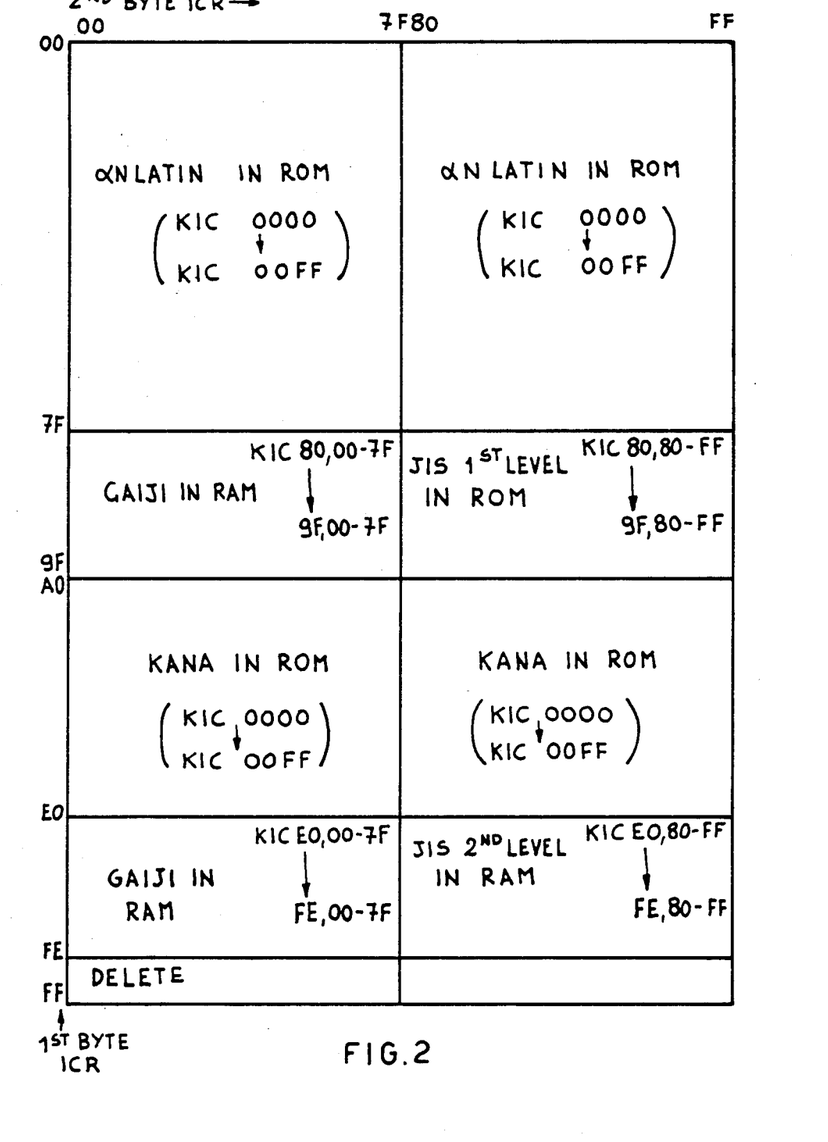
FIG. 2 is a diagrammatic table of the codes used by the character generator of FIG. 1.

FIG. 2 shows the diagrammatic view of the table of codes, KIC, as illustrated above.

The control unit 19 of the VDU 21 receives the commands and the ICR codes of the characters to be displayed, by way of the system bus 13 and an interface 52 (see FIG. 3) which is addressed by the CPU 11 following an interrupt request for characters of the unit 19. In particular, on each occasion the CPU 11 sends a message formed by a string of codes of the characters and the associated attributes. The codes of the characters are passed in bit-parallel, byte serial form by way of a register 53 to the buffer 22, while the codes of the attributes are passed in bit-parallel, word serial form by way of a register 54 to the buffer 23. Immediately after the CPU 11 by way of the interface 52 passes to two registers 55 and 56 the data of the start point of the two buffers 22 and 23 at which recording of the codes is initiated, and passes to two other registers 57 and 58 the data having the length of the two strings of codes registered.

Figure 3:
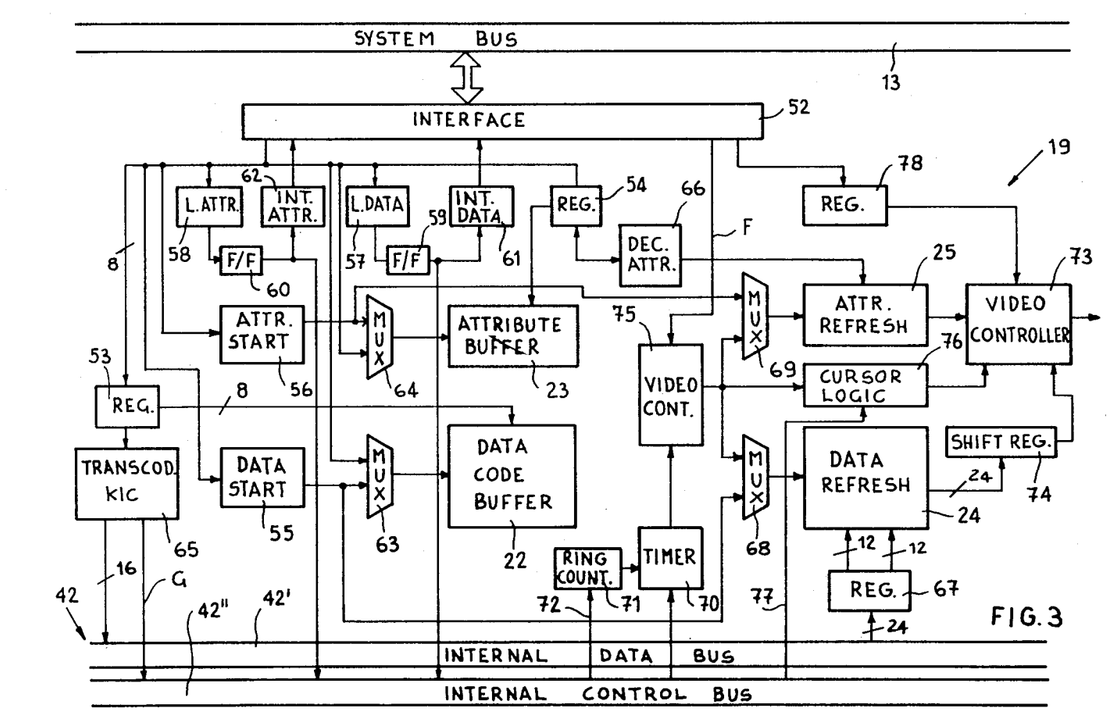
FIG. 3 is a block diagram of the video control unit.

The two registers 57 and 58 now each set a corresponding flip-flop 59, 60 which controls a corresponding interrupt logic unit 61 and 62 respectively, as indicated at "INT.DATA" and "INT.ATTR." respectively.

To generate the characters to be displayed, the bytes of the ICR codes of the buffer 22 are extracted from the point addressed by the register 55, by way of a multiplexer 63. That address is subsequently incremented automatically by way of the multiplexer 63, decrementing the register 57. The bytes extracted by means of the register 53 are passed to a transcoder 65 which is capable of recognizing the codes of a single byte and transforming them into KIC codes of two bytes while the ICR codes of two bytes remain unchanged. Therefore, all the ICR codes inputted to the transcoder 65 are converted into KIC codes in accordance with the table shown in FIG. 2. The KIC codes given by the transcoder 65 are put onto the internal data bus 42' while a character generation command G is applied to the internal control bus 42".

As will be better appreciated hereinafter, the character generating unit 16 (see FIG. 1), in response to a KIC code, generates 24 triplets of bytes wherein the bits=1 represent the dots of each of the character of the respective series (font). The 72 bytes of the character which is thus generated are passed by way of the bus 42', which is 24 bits wide, and a register 67, to the data refresh memory 24 which has a capacity of 24K×24.

In turn, the codes in respect of the attributes which are stored in the buffer 23 (see FIG. 3) are extracted one at a time, by way of the register 54, and are passed to an attribute decoder 66 and decoded thereby. The buffer 23 is initially addressed by the register 56 by way of the multiplexer 64.

The addresses of the buffer 23 subsequent to the initial address are automatically generated by way of the multiplexer 64 which effects incrementation thereof on each occasion, while the register 58 is decremented.

The decoded data from the decoder 66 are stored in the attribute refresh memory 26 which has a capacity of 2K×16.

The data in respect of characters and attributes are stored in the memories 24 and 26 from the point indicated in the registers 55 and 56 by way of two multiplexers 68 and 69 under the control of a video controller formed of a logic control unit 75 which is activated by a command F from the interface unit 52 and a timer 70, for the purpose of incrementing the addresses. The timer 70 is controlled by a counter 71 for counting the elementary rows of the matrix of the characters, being controlled by way of a conductor 72 by the character generator 16 in a manner which will be better appreciated hereinafter. When the register 57 or 58 goes to zero, it resets the corresponding flip-flop 59 and 60 which conditions the corresponding interrupt logic unit 61 and 62 to pass by way of the interface unit 52 an interrupt signal and thus a signal requesting fresh data.

The VDU 21 (see FIG. 1) is controlled by a control unit 73 which receives the attributes from the refresh memory 26 and the bits of the dots to be displayed from a shift register 74 at which they arrive three bytes in parallel from the refresh memory 24.

The unit 73 is also controlled by a cursor logic unit 76 formed by a 2K×1 memory capable of indicating the position of the cursor on the video unit 21 in accordance with the address coming from the CPU 11 by way of the interface 52 and the unit 75. The cursor logic unit is also controlled, by way of a conductor 77, by the character generator 16 according to whether, from time to time, the character is a Kanji character or an ISO, Kana or reduced Kanji character. The unit 73 is controlled by the unit 75 in such a way as to cause repeated sequential display of the dots provided by the memories 24 and 26, whereby the display on the video unit 21 is refreshed.

The unit 73 is also controlled by the input from the CPU 11, by way of the bus 13 and the interface 52 of a register 78. The latter comprises three flip-flops, the setting of which controls, in known manner, respectively inversion of the dots to be displayed with those of the background, disablement in respect of synchronism of the video unit and enablement of the phantom character attribute whereby that character may be selectively rendered invisible under the control of the CPU 11.

The control module 27 (see FIG. 1) exchanges the ICR codes with the CPU 11 by way of the bus 13 and an associated interface 94 (see FIG. 4) which is common to the two units 28 and 29. In particular, the ICR codes of characters and commands generated by each keyboard 32 (see FIG. 1), by way of an interface 87 (see FIG. 4), are passed to the corresponding serial interface 33 and 34 respectively. The interfaces 33 and 34 pass the codes to the bus 13, in bit-parallel, byte-serial form, by way of a multiplexer 178 and the interface 94.

The ICR codes to be printed, before reaching the bus 13, are analysed by the CPU 11 (see FIG. 1) which distinguishes the codes formed by a single byte from those formed by two bytes. When a code formed by a single byte is recognized, the CPU 11 passes a signal on a conductor 80 (FIG. 4) and a first sequence of codes which is indicative of the fact that the codes of the characters which follow are of the single byte type. When however a two byte code is recognized, the CPU 11 emits another sequence of codes which is indicative of the fact that the codes of the characters which follow are of two byte type. For each message, the CPU 11 obviously emits an address code which establishes if they are directed to the unit 28 or 29.

If the CPU 11 has recognized a single byte ICR code, it is passed directly to the interface SIO of the unit addressed, by way of a multiplexer 79 (see FIG. 4) which is controlled by the signal indicative of recognition of that type of code received on the conductor 80. The code is then passed serially by way of an interface 81 to a logic unit 93 (see FIG. 1) which is capable of recognizing the sequences of codes that precedes a series of character codes. When the sequence indicative of the character codes formed by a single byte is recognized, the logic unit 93 commands a switching means 82 in such a way that the code bits arriving from the interface 81 are stored in a register 83 associated with the control unit 39 of the printer 31. The register 83 now addresses the ROM 41 which thus directly generates the print signals for the unit 39 of the printer 31.

It will be clear therefore that the ISO characters including the reduced Kanji and Kana characters represented by the above-mentioned single byte ICR codes are printed without passing through the character generator 16 (see FIG. 1). If however the CPU 11 has recognized the first byte of a Kanji code, it passes that byte and the immediately subsequent byte to a 16 bit register 84 (see FIG. 4) associated with the unit 28, 29 addressed. Those two bytes, by way of two registers 85 and 86, are passed to the bus 42' for the further generation of the corresponding Kanji character. As will be seen in greater detail hereinafter, in response to such data, the character generator 16 (see FIG. 1) passes on the internal bus 42' for each of the 24 rows of the matrix of the character, a group of three bytes which represent the dots to be printed in the corresponding row of the character. Each group of three bytes of the font, by way of the two registers 85 and 86 and a third register 88, is loaded in parallel in the respective FIFO memory 36, 37, the capacity of which is 128 bytes.

Figure 4:
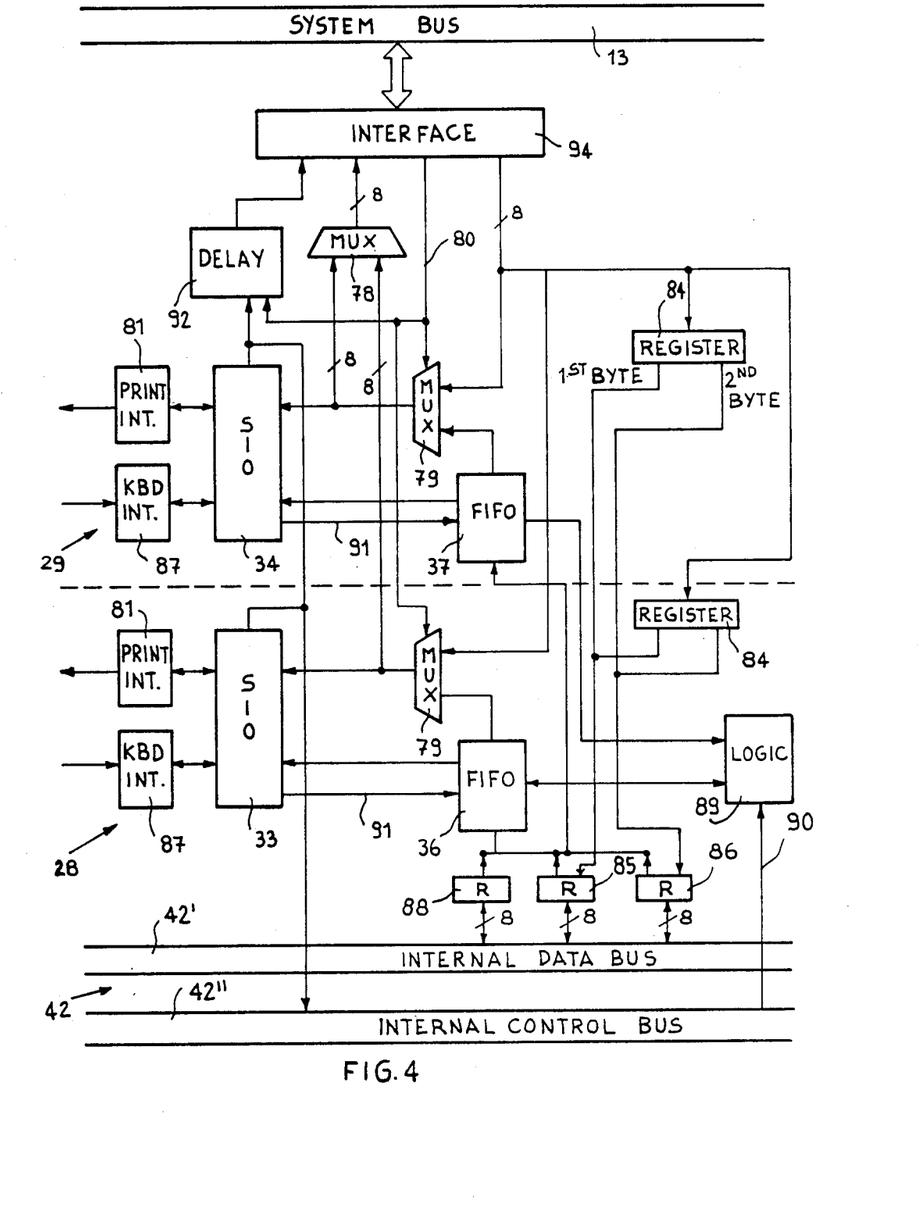
FIG. 4 is a block diagram of a control module of an operating station.

A logic circuit 89, which is controlled by the character generator 16 by way of a channel 90 controls storage of the bytes of the character in the FIFO memories 36 and 37.

The control unit 39 (see FIG. 1) of the printer 31, by way of the corresponding SIO interface 33, 34 (see FIG. 4) and a channel 91, now recalls the bytes which are loaded in the above-indicated manner, from the FIFO memory 36 and 37, one at a time. Each byte reaches the corresponding interface 33, 34 by way of the multiplexer 79, and from the corresponding interface 33, 34, reaches the logic unit 93 (see FIG. 1). Since the latter had recognized the sequence of codes which is indicative of the two byte character codes, it controls the switching means 82 in such a way as to pass the subsequent bits directly to the unit 39 which thus controls printing of the respective dots of the matrix of the character. It will be clear therefore that, for Kanji and Gaiji characters, the unit 39 of the printer 31 receives the bits of the character in already decoded form.

The speed of exchange of the signals in the channel 80 is very high (96,000 bits per second). When passing single byte ICR character codes to the serial interfaces 33 and 34, such a speed would cause interruptions in character request at the CPU 11 at a high frequency by virtue of the response capacity of the logic unit 14. In order not to privilege the printer, the interrupt signals from the interfaces ISO to the interface 94 (FIG. 4) pass through a delay circuit 92 which is activated by the signal on the conductor 80, whereby the frequency of reception of such ICR codes by the printer 31 is reduced.

The character generator 16 is connected to the bus 13 by way of its own interface 96 (see FIG. 5). It comprises a further random access memory 97 with a capacity of 2K×8 for storing ICR codes, each of two bytes, relating to Kanji and Gaiji characters, the font of which is stored in the RAM 18. Therefore, the memory 97 which hereinafter will be referred to as the "Gaiji code table" is loaded at the moment of initialization with 512 codes of which the first 384 never change.

The two byte code passed by the video control unit 19 or the module 27 on the internal data bus 42′ is always a KIC code. It is staticised in a latch 98 which is connected by means of a channel 99 to a address or code converter 101 and to a seek Gaiji or code search logic unit 102. A character generator controlling circuit 103 is enabled by the CPU 11 to generate row counting pulses under the control of a timer 104. The circuit 103 controls a pair of circuits 106 and 107 which are respectively associated with the ROM 17 and the RAM 18 which are capable of sequentially generating the addresses of the successive triplets of bytes of the character from the initial address of the character.

The circuit 103, by way of the internal bus 42″, also controls the row counter 71 (FIG. 3) of the unit 19 for controlling the video unit 21.

If the KIC given by the latch 98 (see FIG. 5) relates to one of the characters contained in the ROM 17, it addresses at its input the converter 101 which at its output gives, in 12 bits, the corresponding physical address of the beginning of the character in the ROM 17. Corresponding to that input address, at the output, is the first triplet of bytes of the first row of characters. The alphanumeric ISO and Kana characters are displayed at the video unit 21 only in accordance with a matrix comprising 24×12 dots, therefore for these the ROM 17 provides only 12 bits. For that purpose, the output of the ROM 17 comprises a channel 109 for carrying the 12 bits of the left-hand half of the matrix, and thus the characters represented in ICR code by a single byte. The output of the ROM 17 further comprises a channel 111 for carrying the bits of the right-hand half of the matrix. The channel 111 is therefore of relevance to the Kanji characters represented by the first level JIS codes while for the characters represented by a single byte ICR code, which are displayed in accordance with the reduced matrix of 24×12 dots, it is inhibited. The bits of the two channels 109 and 111 pass through a multiplexer 112 which is controlled by the logic circuit 103 in such a way as to change in output order the bits of the two channels 109 and 111, whenever that is necessary for correct alignment of the characters on the video display 21.

The output bits from the multiplexer 112 are staticised by a driver register 114 and put on the internal bus 42′. The procedure is then repeated in a similar fashion under the control of the circuit 106 for the subsequent rows of the matrix. The control unit 103 further controls the register 114 in such a way as to pass to the bus 42′ the bytes of the first two and the last two rows of the matrix which separate the characters.

If the KIC code provided by the latch 98 does not concern the ROM 17, that represents a second level JIS character or a Gaiji character and is to be sought in the RAM 18.

That search is carried out by way of the logic unit 102 which sequentially compares the KIC code received with the codes recorded in the table 97. If the result of that search is positive, the logic unit 102 will address the RAM 18 with the code found, whereby the operation of extracting the bytes of the character begins, whether it is in the region 49 or in the region 51. Those bytes are extracted one at a time under the control of the circuit 107 and are temporarily stored in groups of three in a register 115. The register has two 12-parallel output channels which are connected to the channels 109 and 111 whereby the signals indicative of the rows of dots are applied to the bus 42′, in the manner described above.

If the result of the search carried out by the circuit 102 in the table 97 is negative, that means that the character of the Gaiji code in question is not in the RAM 18. In particular, it is not at that time loaded into the region 51 of the RAM 18 but is in the archive memory of the disc unit 47 (see FIG. 1).

In that situation, the circuit 102 (see FIG. 5) emits a signal "NOGA" which causes the code which has not been found to be loaded into a two byte register 116 connected to the interface 96. In addition, the signal NOGA is applied in AND relationship with a state of a flip-flop 117 to an interrupt logic unit 118. The latter, by way of the interface 96 and the bus 13, causes the CPU 11 (see FIG. 1) to call on a software module to permit searching for the code in the disc unit 47. The interrupt signal of the logic unit 118 (see FIG. 5) so conditions the circuit 103 as temporarily to address the blob character of the region 49 of the RAM 18, the font of which is made available on the bus 42′ to the control unit 19 of the video display 21 if the code which has not been found is requested for display. In addition, the circuit 103 causes a Gaiji load control circuit 108 to emit a signal B to indicate that the system is occupied in seeking the Gaiji code and causes it to command shift of the characters in the region 51 of the RAM 18 and shift of the KIC codes in the part of the table 97 corresponding to the region 51, thereby predisposing for storage of the fresh character in the region 51 of the RAM 18 and in the table 97, which thus operate as a FIFO.

For the character which is not found, the software module now controls the CPU 11 (see FIG. 1) in such a way as to compare the code of the register 116 sequentially with the codes of the characters stored in the disc unit 47. When the code is finally found, by way of the bus 13 and the interface 96 the CPU 11 sequentially passes a command to the logic circuit 103 for controlling generation of the character under the control of the timer 104 and subsequently to an input register 119, a series of bytes which firstly comprise the two bytes of the KIC code and then the 72 bytes on the font. The circuit 108 now provides for storing the two bytes of the KIC code into the table 97 and the 72 bytes of the font into the region 51 of the RAM 18.

Finally, the circuit 108 issues a signal GAI which, in AND relationship with the state of the flip-flop 117, resets the interrupt control circuit 118. The operation now begins, of extracting from the region 51 of the RAM 18, the bytes of the Gaiji character which has just been loaded, which is displayed at the position of the blob and/or printed character, as previously described.

Access of the various units 19, 28, 29 and 43 to the single character generator 16 is regulated by a bus priority and arbitration logic means of the polling type, which is diagrammatically indicated by reference numeral 120 in the unit 16 which functions as a master unit and reference numeral 121 in the other units 27, 43 and 19 which function as slave units.

It should be noted that, during the process of up-dating the storage of the RAM 18, caused by a signal NOGA (FIG. 5), the circuit 101 may accept possible codes which address the ROM 17, either for a video unit 21 or for a printer 31.

However, the circuit 102 cannot accept another Gaiji code and obviously cannot cause the circuit 118 to generate a second interrupt for a code search at the disc unit 47 until the search which is taking place is finished.

It will be appreciated that the above-described apparatus may be the subject of various modifications, improvements and addition of parts without departing from the scope of the invention. For example, the random access memories may be formed by various portions of memories of greater capacity. In addition, the refresh memories 24 and 25 may be duplicated so that, while a video page is being displayed, a fresh page is being loaded. Finally, the RAM 18 may be of such a capacity as to provide for the register 115, the bytes of the first two and the last two rows of the matrix, thus producing richer characters over the entire matrix comprising 28×24 dots.

We claim:

1. A data processing apparatus including a central processing unit for processing alphanumeric character codes representing alphanumeric characters and ideographic character codes representing ideographic characters of Oriental languages, a character generator for providing for each of said codes a series of signals indicative of the corresponding character according to a dot matrix, and at least one output peripheral unit controlled by said character generator for visually outputting dot matrix characters corresponding to the character codes processed by said processing unit, said character generator including:
   a mass memory permanently storing a plurality of ideographic character codes and of associated ideographic dot matrix characters, said processing unit being operable to selectively read out said stored ideographic codes and characters from said mass memory,
   read-write memory means controlled by said processing unit for temporarily storing selected ideographic codes and characters read out from said mass memory, said memory means being controlled to selectively store a number of ideographic characters less than said plurality,
   said memory means including a first portion conditioned by said processing unit upon being initialized for storing a predetermined first series of ideographic characters read out from said mass memory, and a second portion controlled by said processing unit for storing a group of additional ideographic codes and characters selectively read out from said mass memory, said apparatus further including searching means for searching in said memory means the code of an ideographic character requested for being visually outputted, addressing means responsive to said searching means for addressing in said memory means the corresponding ideographic character when the requested code is found, and transfer control means responsive to said searching means for causing said processing unit to transfer the ideographic character and the relevant code from said mass memory and for recording same in said second portion of the memory means according to a FIFO procedure, thus replacing therein the first ideographic character and the relevant code recorded in said second portion.

2. Apparatus according to claim 1, wherein said read write memory means comprise a RAM for storing said ideographic dot matrix characters and storing means for storing, in association with the ideographic characters stored by said RAM, a table of the corresponding ideographic character codes, said searching means searching in said table the code of the requested ideographic character, and said addressing means addressing said RAM when the requested code is found in said table, said transfer means when the requested code is not found in said table conditioning said processing unit to store the ideographic character so read out into the second portion of the RAM and the corresponding code into said table.

3. Apparatus according to claim 1, wherein said character generator comprises a ROM addressable by the alphanumeric character codes representing alphanumeric characters for generating the series of signals indicative of the corresponding character according to a dot matrix.

4. Apparatus according to any one of the preceding claims, characterised in that the character generator is connected by way of an internal bus to a plurality of peripheral units, and further comprising internal bus arbitration and priority means for coordinating the character requests of the peripheral units.

5. Apparatus according to claim 4, wherein one of the peripheral units comprises a dot printer, characterised in that the printer is controlled for printing by the series of signals generated by character generator by way of a serial interface.

6. Apparatus according to claim 5, characterised in that the printer comprises an associated standard character generator which can be addressed by means of the character codes representing a set of a standard alphanumeric characters, means being provided for recognizing the codes of the standard characters to be sent to the said standard character generator.

7. Apparatus according to claim 6, characterised in that the standard character codes comprise one byte and the codes of the ideographic characters comprise two bytes and are so selected that the first byte of the code contains the information for distinguishing a one byte code from a two byte code.

8. Apparatus according to claim 7, characterised in that the first byte of each two byte codes has bit 7=1 and bits 0-6 different from those of the standard character codes.

9. Apparatus according to claim 6, characterised in that the codes of the standard characters are passed to the said other character generator by way of the serial interface, the recognition means when they do not recognize a standard code being arranged to provide for direct control of the printer by the signals from the serial interface.

* * * * *